United States Patent [19]

Reitberger

[11] Patent Number: 5,218,717
[45] Date of Patent: Jun. 8, 1993

[54] SIMULCAST TRANSMISSION SYSTEM WITH IMPROVED SYNCHRONIZING SYSTEM

[75] Inventor: Peter Reitberger, München, Fed. Rep. of Germany

[73] Assignee: Rohde & Schwarz GmbH & Co. KG, Fed. Rep. of Germany

[21] Appl. No.: 635,974

[22] Filed: Dec. 31, 1990

[30] Foreign Application Priority Data

Jan. 10, 1990 [DE] Fed. Rep. of Germany ....... 4000538

[51] Int. Cl.$^5$ ............ H04B 7/005; H04B 17/02; H04H 3/00
[52] U.S. Cl. ................ 455/51.2; 455/56.1; 455/67.6
[58] Field of Search ............ 455/13.1, 16, 18, 51.1, 455/51.2, 56.1, 59, 60, 67.4, 67.6; 370/92, 108; 375/107, 109

[56] References Cited

U.S. PATENT DOCUMENTS 4,513,415 4/1985 Martinez ............... 455/56.1 X
4,703,324 10/1987 White ................... 455/51.1 X

FOREIGN PATENT DOCUMENTS 0040731 12/1981 European Pat. Off. .
0072984 3/1983 European Pat. Off. .
0118710 9/1984 European Pat. Off. .
3244256 5/1984 Fed. Rep. of Germany .
3035679 3/1989 Fed. Rep. of Germany .

Primary Examiner—Reinhard J. Eisenzopf
Assistant Examiner—Chi H. Pham
Attorney, Agent, or Firm—Hill, Steadman & Simpson

[57] ABSTRACT

In a simulcast transmission system, a plurality of simulcast transmitters are spatially distributed throughout a broadcasting area, broadcast substantially at the same carrier frequency and are synchronously modulated with a wanted simulcast signal, at least two of the simulcast transmitters being simultaneously modulated with at least one further auxiliary signal with a type of modulation which is different from that wanted signal, and at least one of the receiver comprises means for separately evaluating the different wanted signal and auxiliary signal modulations.

12 Claims, 2 Drawing Sheets

SIMULCAST TRANSMISSION SYSTEM WITH IMPROVED SYNCHRONIZING SYSTEM

BACKGROUND OF THE INVENTION

1. Field of the Invention

The present invention is directed to a simulcast transmission system (=simultaneous broadcasting system) comprising a plurality of simulcast transmitting stations which are spatially distributed throughout a broadcasting area and transmit substantially at the same carrier frequency.

2. Description of the Prior Art

Simulcast transmission systems of the specified kind have been known, for example from the German patent specification 3,035,679, the European patent specification 0,118,710, the European patent specification 0,040,731, the European patent specification 0,072,984 or the German offlengunsscnrift 3,244,256 respectively). It is a feature common to all of these simulcast transmission systems that, for the purpose of synchronzing the wanted simulcast signals, it is necessary to interrupt the wanted-signal transmission of all simulcast transmitters, whereupon in a separate measuring process the individual simulcast transmitters successively transmit measuring signals, and control signals for controlling delay means are then generated in a control station on the basis of the time difference between transmission and renewed receipt of these measuring signals.

SUMMARY OF THE INVENTION

It is therefore the object of the invention to extend and improve a simulcast transmission system of the above-specified kind in respect of its possible uses, and especially to enable synchronization of the transmission of the wanted simulcast transmission signals without interrupting the transmission thereof.

Based on a simulcast transmission system, the specified object is achieved by providing that at least two of the simulcast transmitting stations are simultaneously modulated, with a type of modulation which is different from that of the wanted signal, with at least one further auxiliary signal, and wherein at least one receiver is provided which includes means for separately analyzing the different wanted and auxiliary signal modulations.

According to a particular feature of the invention, the simulcast transmission system is characterized in that the auxiliary signal is used to identify the respective simulcast transmitter broadcasting the auxiliary signal.

According to another feature of the invention, the simulcast transmission system is characterized in that the transmitter identification is constituted by the information content of the modulated auxiliary signal.

According to another feature of the invention, the transmitter identification is constituted by the time relationship between the wanted signal and the auxiliary signal.

According to another feature of the invention, a plurality of simulcast transmitters are provided to which wanted signals are supplied from a common control station via separate transmission paths and to which auxiliary signals are additionally supplied via these transmission paths, the auxiliary signals, after transmission by the simulcast transmitters, being received in at least one measuring receiver and being analyzed in analyzing means thereat, the analyzing means determining from the identification of the auxiliary signals received in the measuring receiver the allocation thereof to the respective simulcast transmitters, and broadcasting of the wanted signals in the simulcast transmitters is synchronized on the basis of the time difference between the receipt of the auxiliary signals from the respective associated simulcast transmitters.

According to another feature of the invention, the simulcast transmission system is characterized in that the auxiliary signal is used for news supply of a limited sub-area of the overall broadcasting area and is additionally modulated only upon the simulcast transmitters which supply that particular sub-area.

According to another feature of the invention, the simulcast transmission system is characterized in that, from the identification of the received auxiliary signals, their allocation to the respective simulcast transmitters is determined in a receiver which is coupled either to the control station or to the simulcast transmitters, and that, from the local field strength of overlapping neighboring simulcast transmitters, control parameters for the transmitting power and/or the carrier frequency and/or the degree of modulation of the simulcast transmitters are determined.

According to another feature of the invention, the simulcast transmission system is characterized in that the wanted simulcast signals are modulated upon the carrier of the simulcast transmitters by amplitude modulation and the auxiliary signals are modulated by frequency modulation, phase modulation or a combination of amplitude, frequency and phase modulation.

According to another feature of the invention, the simulcast transmission system is characterized in that the wanted simulcast signal is modulated upon the carrier of the simulcast transmitters by frequency modulation and the auxiliary signal is modulated by amplitude modulation, phase modulation or a combination of amplitude, frequency and phase modulation.

According to another feature of the invention, the simulcast transmission system is characterized in that the wanted simulcast signal is modulated upon the carrier of the simulcast transmitters by phase modulation and the auxiliary signal is modulated by amplitude modulation, frequency modulation, or a combination of amplitude, frequency and phase modulation.

According to another feature of the invention, the simulcast transmission system is characterized in that the wanted simulcast signal is modulated upon the carrier of the simulcast transmitters by a combination of amplitude, frequency and phase modulation and the auxiliary signal is modulated by amplitude, frequency or phase modulation or any other combination of amplitude, frequency and phase modulation.

According to another feature of the invention, the simulcast transmission system is characterized in that the wanted simulcast signal is modulated by amplitude modulation, frequency modulation, phase modulation, or any combination of these types of modulation and the auxiliary signal is modulated by a defined slight change of the carrier center frequency of the simulcast transmitters.

A simulcast transmission system constructed in accordance with the present invention not only broadcasts the wanted simulcast transmission signals via the various simulcast transmitters within the broadcasting range, but transmits at least one further auxiliary signal at the same time, i.e. in parallel therewith with a different modulation. Stationary or mobile receivers within the broadcasting range, for example also mobile transmitter-receivers, which are equipped with corresponding separate demodulators for the wanted signals and the auxiliary signals that are broadcast with different modulations, are thereby enabled to evaluate not only the wanted simulcast signals, but the additional auxiliary signals, especially in combination with the simultaneously received wanted signals, permit the most varied novel uses of such a simulcast transmission system. In the simplest case, for example, an additional message is transmitted via the auxiliary signal. When only a few selected simulcast transmitters are modulated with said additional message, local news can be broadcast in a selected sub-area of the entire broadcasting range, such as for instance warning or emergency calls in locally-limited sub-areas.

Another use resides in the possibility of determining, on the basis of these auxiliary signals, the service area from which one of the respective simulcast transmitters an auxiliary signal is currently being received, provided the auxiliary signals are directly characteristic of the respective simulcast transmitters. In that case the various simulcast transmitters are modulated with different auxiliary signals, and the receivers are enabled to identify the respective simulcast transmitters from these auxiliary signals. A further possibility of identifying the simulcast transmitters resides in the use of the time relationship between the wanted signal and the auxiliary signal transmitted via the same simulcast transmitter, wherein, for example the auxiliary signal is transmitted within the first 100 ms from the transmission of a wanted simulcast signal within a predetermined time following the leading edge of the wanted simulcast signal. The predetermined time differences between leading edge of the wanted signal and leading edge of the auxiliary signal are thus directly characteristic of the respective simulcast transmitter.

An especially advantageous possible, use of the simulcast transmission system according to the present invention is, however, the feature that it is for the first time made possible to check, and possibly to correct, the synchronization of the wanted simulcast signals while they are being transmitted. This no longer permits the interruption of the wanted signals for synchronizing the same, as in the known simulcast transmission systems, since according to the invention, such transmission of the wanted signals and the measuring signals for synchronization is not performed successively, but rather in a parallel time relationship, i.e. simultaneously. By a corresponding analysis of the continually transmitted auxiliary signals in the measuring receiver, it is possible to continuously monitor whether the auxiliary signals are respectively transmitted from the various simulcast transmitters with the time difference required for synchronous transmission of the wanted simulcast signals, because these auxiliary signals also pass along the same transmission paths between the control station and the individual simulcast transmitters and the same transmission paths to the measuring receiver as the wanted simulcast signals, so that any possibly asynchronous condition of these auxiliary signals directly represents a corresponding indication of the asynchronous state of the wanted simulcast signals which may be compensated again by a corresponding readjustment of the delay circuits as known per se. This advantageous operation of a simulcast transmission system according to the invention is made possible due to the feature that in the measuring receiver, or in the analyzing means cooperating therewith, the individual simulcast transmiters may be identified by way of the identification of the individual auxiliary signals, so that also during simulcast operation the respective time delays in the transmission routes can be measured and possibly corrected on the basis of the auxiliary signals.

Moreover, the simulcast transmission system according to the present invention makes it possible to avoid cancellation zones in areas of overlap, of the simulcast transmitters by direct control of the transmitter power of the various simulcast transmitters, or the carrier frequency, or degree of modulation thereof, respectively. When, for instance, a stronger or weaker cancellation of the received signal is found through a measuring receiver in the area of overlap of two neighbouring simulcast receivers due to field-strength interference of the two transmitters, it is possible by way of the measuring receiver coupled to the control station to provide a corresponding control signal for one of the two transmitters for increasing the transmitter power, and by the increase in the transmitter power the interference zone is displaced in space, whereby the reception conditions at the locus of the measuring receiver are improved. When such a control feature is provided in mobile receivers, which are to be supplied with simulcast information in the broadcasting area, it is possible in this way for every individual mobile receiver to adjust the respective optimum reception conditions.

In respect of the different types of modulation, each simulcast transmitter is provided with correspondingly different modulators for the respective type of modulation, and likewise corresponding separate demodulators are provided in the associated receivers. The separation in the receiver of the wanted and the auxiliary signals received with different modulation could also be performed by adjustment of directional antennas. The type of modulation for the wanted signal and the auxiliary signal, respectively, is selected in accordance with the respective requirements; any of the usual types of modulation such as amplitude, frequency or phase modulation or combinations of these types of modulation are suited for either signal, and it is merely important that the two types of modulation should differ from each other. In respect of the auxiliary signal a defined slight shifting of the carrier frequency of the simulcast transmitter is also possible as a type of modulation, wherein the rate of change or the corner points of the frequency change respectively include the specific signal information; this slight change of the carrier frequency within the range of but a few Hz therefore is a kind of carrier frequency-shift keying with only a defined continuous frequency change and is no longer erratic.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
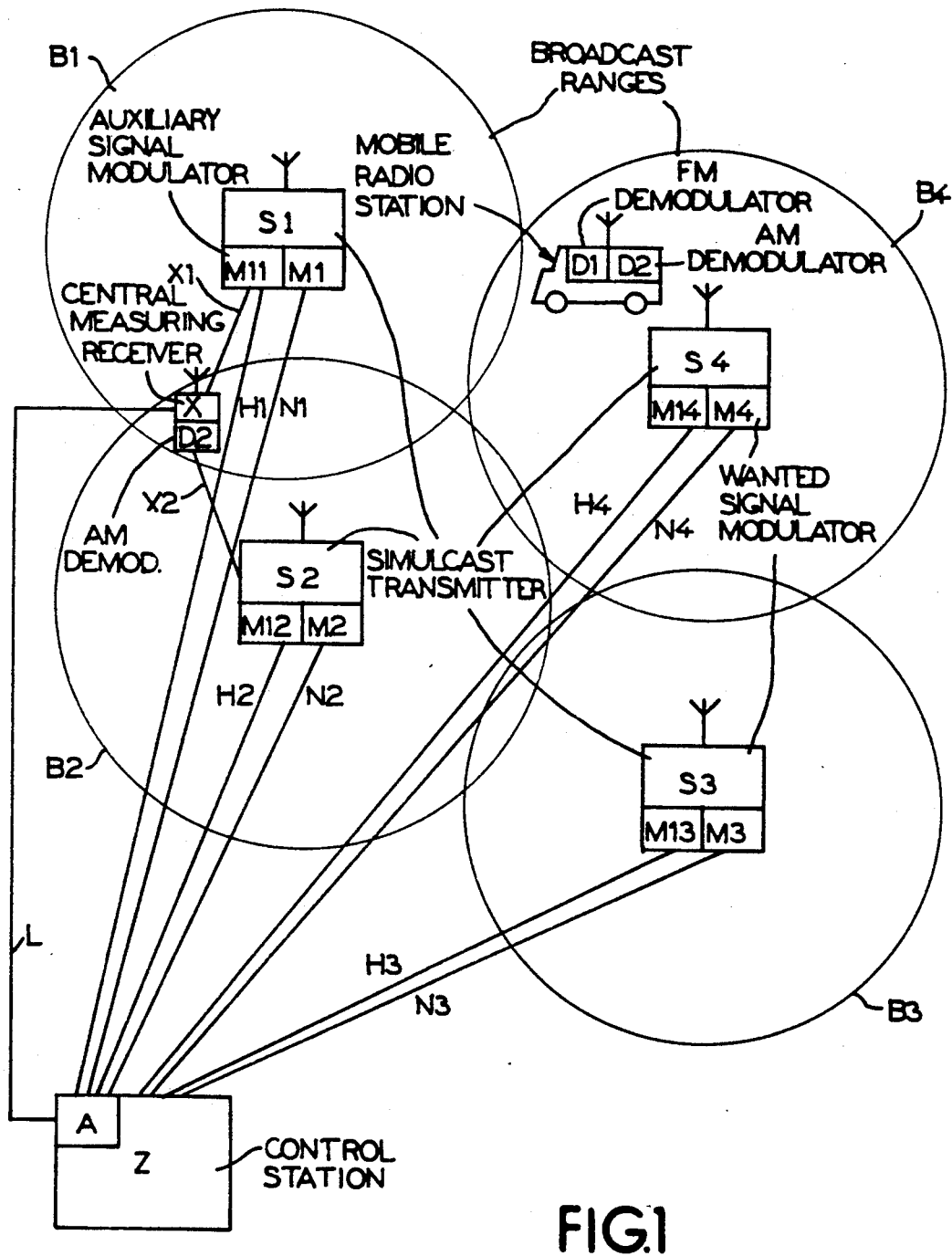
FIG. 1 is a map area type schematic view of a simulcast transmission system constructed and operating in accordance with the present invention.

In a broadcasting area according to FIG. 1, four simulcast transmitters S1 to S4 are distributed with a spatial relationship such that their individual broadcasting ranges B1 to B4 overlap slightly. Within these broadcasting ranges, mobile radio stations E are operable which are adapted to receive wanted simulcast signals from at least one of the simulcast transmitters S1 to S4. The simulcast transmitters transmit substantially at the same carrier frequency, they emit the wanted signals in synchronism, and the synchronization is effected as known per se, for instance according to the German Patent specification 3,035,679 with the help of a central measuring receiver X coupled to a control station Z where synchronism is established through delay means cooperating with a plurality of junction lines N1 to N4. The wanted simulcast signals N are for instance supplied to the individual transmitters through lengths of cable N1 to N4; in the control station Z and, respectively, in the various transmitters S1 to S4 there are provided delay means which are adjusted as known per, se so that the individual transmitters S1 to S4 respectively radiate the wanted simulcast signals N in synchronism. Modulation of the transmitters S1 to S4 with the wanted simulcast signals is respectively effected by modulators M in the transmitters S1 to S4. Generally, frequency modulation is used for modulating the wanted simulcast signals in a simulcast transmission system for supplying mobile transmitter-receivers E within the broadcasting area.

Figure 2:
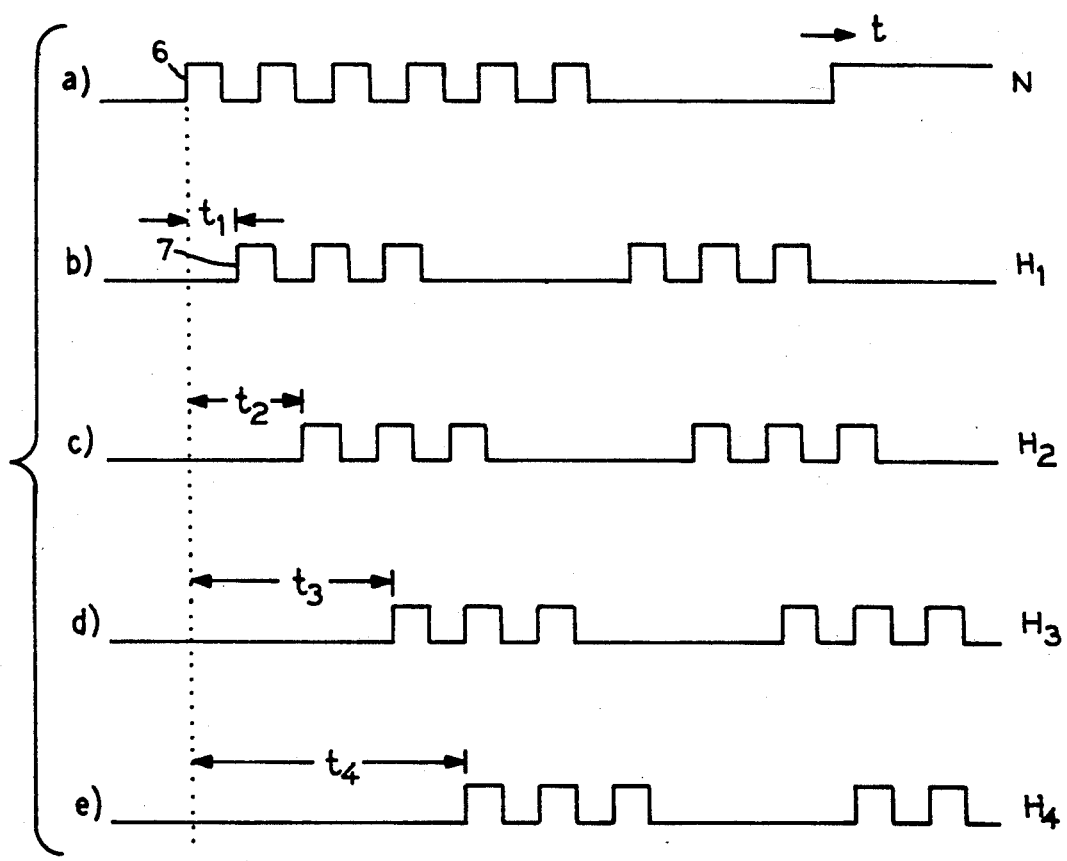
FIG. 2 is a graphic illustration showing the relationship between the wanted signal and the additional auxiliary signals.

In accordance with the present invention, the transmitters S1 to S4 are additionally and simultaneously modulated with a further auxiliary signal H with a different type of modulation. For instance, these auxiliary signals are again supplied from the control station Z via separate lengths of cable H1 to H4 to the various transmitters; instead of via separate junction lines it would also be possible to transmit these auxiliary signals also via the same lengths of cable N1 to N4 as the wanted signals provided separate transmission of the wanted signals and the auxiliary signals is possible. In every transmitter S1 to S4, the carrier frequency of the various transmitters S1 to S4 is modulated with these auxiliary signals H1 to H4 in a second modulator M11 to M14 with a different type of modulation, for instance amplitude modulation. The auxiliary signals H1 to H4 may be information signals so that in the various receivers E the wanted simulcast signals can be evaluated through an FM demodulator D1 while the simultaneously transmitted auxiliary signals can be evaluated through an AM demodulator D2. The information content of the auxiliary signals, for example digital signals, is directly characteristic of each of the four simulcast transmitters S1 to S4, i.e. every receiver is directly able to recognize from the digital data flow of the auxiliary signals H1 to H4 from which one of the transmitters S1 to S4 the received auxiliary signal has been broadcast. However, the transmitter identification may also exist in the relationship between a wanted signal N and an associated auxiliary signal H1 to H4, as illustrated schematically in FIG. 2. FIG. 2, line a illustrates the wanted simulcast signal H, which, in this example, is broadcast simultaneously by all transmitters S1 to S4 as a digital signal having a predetermined standardized data sequence commencing with a leading edge 6. Line b of FIG. 2 shows the time-related broadcasting of the auxiliary signal H1 with the leading edge 7, which is again transmitted as a digital signal in the present example. The leading edge 7 of the auxiliary signal H1 for the transmitter S1 is delayed relative to the leading edge 6 by a predetermined time t1 of 100 μs, for instance, while the auxiliary signal H2 for the transmitter S2 is delayed, as shown in FIG. 2, line c by the time t2 of 200 μs, etc. It is thereby possible to determine directly in the receiver E by a comparison of the wanted simulcast signals N with the respective received auxiliary signals H1 to H4 from which one of the transmitters S1 to S4 the simultaneously received auxiliary signals H1 to H4 have been transmitted.

The identification of the individual transmitters S1 to S4 is a simple means of enabling the synchronization of the individual simulcast transmitters for the synchronous radiation of the wanted simulcast signals N. This is effected through the stationary measuring receiver X, which is coupled via a transmission route L (see FIG. 1) such as another length of cable to an analyzer A in the control station Z; said analyzer permits the discrete identification of the simultaneously received auxiliary signals H1 to H4, i.e. the determination to which one of the transmitters S1 to S4 the respective received auxiliary signals H1 to H4 should be allocated. Again, the measuring receiver X has a demodulator D2 for analyzing the auxiliary signals H1 to H4 (for example another amplitude demodulator). For example, the measuring receiver X receives, at the time x1, the auxiliary signal H1 of the transmitter S1 and, at the time x2, the auxiliary signal H2 of the transmitter S2. The time difference δx between these two times x1 and x2 is a direct indication of the delay to which the auxiliary signals have been subjected while being transmitted from the control station Z to the transmitters S1 and S2, respectively, and finally to the measuring receiver X. As the wanted simulcast signals N are transmitted via the same transmission path, this time relationship between the auxiliary signals H1 to H4 as measured in the measuring receiver X is the same as the corresponding time relationship between the wanted simulcast signals N broadcast from the transmitters S1 to S4, so that the result of this measurement of auxiliary signals can be used directly to adjust the delay means in the control station Z and, at the locus of the various transmitters S1 to S4, respectively, so as to establish synchronism between the broadcast wanted simulcast signals.

In a similar way other parameters of radio technology as related to the individual simulcast transmitters may be controlled such as the transmitting power of the various simulcast transmitters. If, for example, a major decrease in field intensity due to interference is found by a receiver X in the zone of overlap between the transmitters S1 and S2, the transmitting power of the transmitter S2 may, for instance, be slightly increased by way of the control station Z so that the zone of interference is somewhat shifted locally whereby improved reception conditions will prevail, at least at the locus of the receiver X. In the same way the reception conditions may be changed and improved by a corresponding change in the carrier frequency or the degree of modulation of the simulcast transmitters.

Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim:

1. A simulcast transmission system comprising:
a plurality of neighboring transmitting stations having overlapping individual broadcast ranges spatially arranged throughout a broadcast area and each including a first modulator for modulating a carrier frequency with a wanted signal in accordance with a first type of modulation, a second modulator for modulating the same carrier frequency with a unique auxiliary signal which uniquely identifies each transmitting station in accordance with a second type of modulation and a transmitter for transmitting the modulated carrier frequency; and
at least one receiver for receiving the modulated carrier frequency and analyzing means for separately analyzing the different auxiliary signals and identifying each transmitter by its unique auxiliary signal.

2. The simulcast transmission system of claim 1, wherein:
said analyzing means comprises means for detecting a time relationship between the wanted signal and the unique auxiliary signals to identify the respective transmitter.

3. The simulcast transmission system of claim 1 further comprising:
a common control station connected to said receiver, and also to said plurality of transmitters via respective separate transmission paths for supplying the wanted signal thereto via said respective separate transmission paths and for sending the unique auxiliary signals via said separate transmission paths, said common control station having said analyzing means therein, and said common control station including means for adjusting delay means for synchronizing said simulcast transmitters based on a time difference between the unique auxiliary signals from the respective associated simulcast transmitters.

4. The simulcast transmission system of claim 1, wherein:
at least one of said unique auxiliary signals includes information for supplying news to a limited sub-area of the broadcast area.

5. The simulcast transmission system of claim 1, wherein:
said analyzing means includes means for detecting a local field strength of neighboring simulcast transmitters having overlapping broadcast ranges and for providing control signals for controlling an operating parameter of said neighboring transmitters.

6. The simulcast transmission system of claim 1, wherein:
each of said first modulators is an amplitude modulator; and
each of said second modulators is a modulator of a type selected from a group consisting of frequency modulators and phase modulators.

7. The simulcast transmission system of claim 1, wherein:
each of said first modulators is a frequency modulator; and
each of said second modulators is a different type of modulator selected from a group consisting of amplitude modulators and phase modulators.

8. The simulcast transmission system of claim 1, wherein:
each of said first modulators is a phase modulator; and
each of said second modulators is a different type of modulator selected from a group consisting of amplitude modulators and frequency modulators.

9. The simulcast transmission system of claim 1, wherein:
each of said first modulators is a combination amplitude, frequency and phase modulator; and
each of said second modulators is a modulator selected from a group consisting of amplitude modulators, frequency modulators, phase modulators and any combination of amplitude modulators, frequency modulators and phase modulators.

10. The simulcast transmission system of claim 1, wherein:
each of said first modulators is a type of modulator selected from a group consisting of amplitude modulators, frequency modulators, phase modulators and combinations of amplitude modulators, frequency modulators and phase modulators; and
each of said second modulators is a modulator producing a defined slight change of a carrier center frequency of the simulcast transmitting stations.

11. A simulcast transmission system, comprising:
a plurality of neighboring transmitting stations having overlapping individual broadcast ranges spatially arranged throughout a broadcast area, each of said transmitting stations having first modulator means for modulating a carrier frequency with a wanted signal in accordance with a first type of modulation, and a second modulator means for modulating the same carrier frequency with a unique auxiliary signal which uniquely identifies the respective transmitting station in accordance with a second type of modulation, and a transmitter means for transmitting the modulated carrier frequency;
a central control station means connected by cables to each of said transmitting stations for transmitting said wanted signal to each of said transmitting stations and for sending each of said unique auxiliary signals to the respective transmitting stations;
receiver means in said broadcast area for receiving said modulated carrier frequency; and
analyzer means connected to said receiver means and said central control station means for analyzing said auxiliary signals, based on the analysis, and synchronizing wanted signal transmission from each of said stations in the overlapping broadcast ranges.

12. A system according to claim 11 wherein said means for synchronizing comprises adjusting a delay for signal transmission of the wanted signal to the various transmitters.

* * * * *